Dec. 24, 1968   M. BLOOM   3,417,629
CAM MECHANISM
Filed Aug. 16, 1966
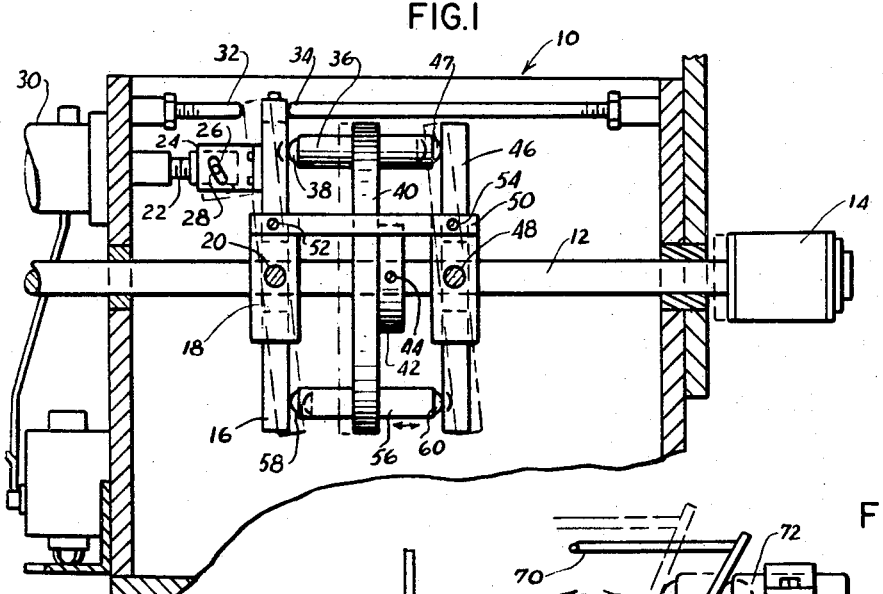
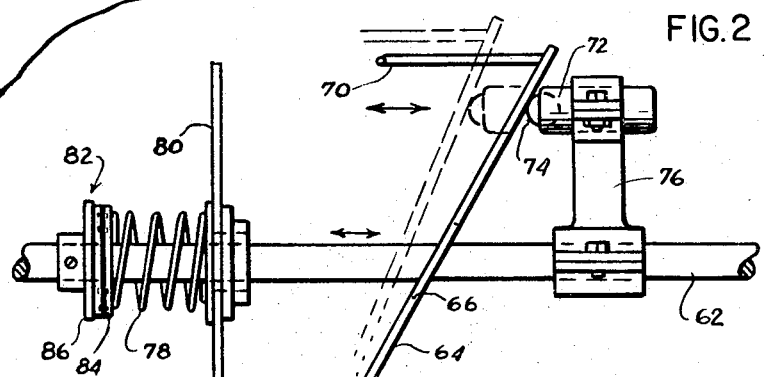
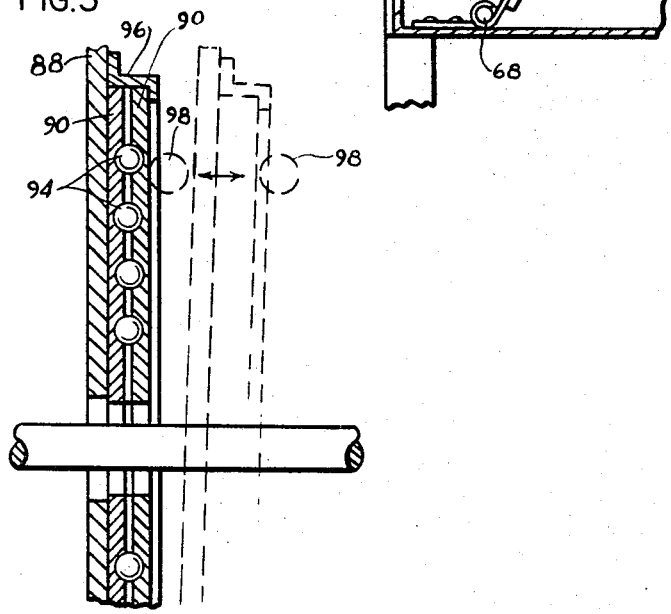
INVENTOR.
MEYER BLOOM
BY
ATTORNEYS

United States Patent Office 3,417,629
Patented Dec. 24, 1968

3,417,629
CAM MECHANISM
Meyer Bloom, 955 Rutland Road,
Brooklyn, N.Y. 11212
Filed Aug. 16, 1966, Ser. No. 572,727
2 Claims. (Cl. 74—56)

ABSTRACT OF THE DISCLOSURE

Cam mechanism for imparting axial oscillatory motion to a rotating shaft is provided by a parallel pair of plates having central apertures with the shaft extending through the apertures. The plates extend across the axis of the shaft and are pivoted for inclining their planes with respect to the axis of the shaft. A push rod adjusts the inclination of the plates and a cross strap holds the plates parallel. A radially-extending cam follower plate attached to the shaft extends between the pair of plates and carries a first cam follower shaft which extends between and rides on the inner surfaces of the plates to oscillate the rotating shaft axially in accordance with the inclination of the plates. A second cam follower shaft is slidably carried through the cam follower plate at a point diametrically opposed from the first cam follower shaft and extends between and rides on the inner surfaces of the plates to balance the first cam follower.

This invention relates to a cam mechanism and, more particularly, relates to an improved cam mechanism for imparting oscillatory motion to a rotating shaft in which the stroke of oscillation is continuously controllable during use of the cam.

In many applications, it is desirable to impart an oscillatory motion to a rotating shaft. Although many cam mechanisms are described for the purpose of conversion of rotary to linear motion, few are described for combined rotary and oscillatory shaft motion.

With the described arrangements, the oscillation stroke can not be varied except by replacement of the cam or related mechanisms. Such replacement involves machine down time, an undesirable condition. Further, the desirable ability of adjustment of the stroke during operation of the mechanism is not possible with the mechanisms described in the art.

It is, therefore, an object of the present invention to provide a cam mechanism for imparting oscillatory motion of controllable stroke to a rotating shaft.

In accordance with this object, there is provided, in a preferred embodiment of this invention, a plate having a central aperture. The plate is mounted with the rotating shaft, to which an axial oscillatory motion is to be imparted, passing through said aperture. A follower is mounted on the shaft and is radially displaced therefrom. The follower is urged into engagement with the plate and is preferably provided with an element on the follower to reduce the friction of traversement over the surface of said plate. The plane of the plate is inclinable with respect to the axis of said shaft. To accomplish this purpose, the plate is hingedly mounted and is provided with an arrangement such as a push rod for adjustment of the inclination of said plate. When the plate is positioned to extend radially from the shaft, the follower traverses the plate with no displacement thereof in the direction along the axis of said shaft. Thus, the shaft motion is purely rotational. When it is desired that oscillatory motion be superimposed upon the shaft's rotational motion, the plane of said plate is inclined. When the plate is inclined, the follower now imparts an axial motion to the shaft superimposed upon the rotation thereof. The stroke can be continuously varied to suit the application intended without the necessity of stopping the shaft rotation. Thus, there is provided a mechanism for continuous variation in the shaft stroke which can be made without the necessity of stopping the shaft rotation to change the cam.

Having briefly described this invention, it will be described in greater detail along with other objects and advantages in the following portions of the specification, which may best be understood by reference to the accompanying drawings, of which:

FIG. 1 is an elevation view partially in section of one embodiment of a cam mechanism in accordance with the present invention;

FIG. 2 is a partially sectioned elevation view of another embodiment of the present invention; and FIG. 3 is a sectioned elevation view of another embodiment of a cam employable with the arrangements of FIGS. 1 and 2.

In FIG. 1, there is shown a cam mechanism 10 to impart oscillatory motion of controlled stroke to a rotating shaft 12. The rotating shaft may drive a utilizing mechanism 14 which may be, for example, an agitator in a washing machine, a ball winding mechanism or the like in which it is desired to have simultaneous rotation and axial displacement of continuously controllable amplitude throughout the operating cycle. To provide controlled axial displacement of the rotating shaft, there is provided a cam plate 16 having a central aperture 18 through which shaft 12 extends. The cam plate is pivotably mounted on a pivot pin 20. The displacement of the cam about pin 20 is controlled by a push rod 22 hingedly coupled to the plate by the hinge plate 24 having a guidance slot 26 within which a coupling pin 28 moves. A push rod is, in this embodiment, controlled by a hydraulic piston 30. When desired, mechanical stops 32 and 34 may control the limit of plate inclination.

A follower 36 is coupled to shaft 12 at a radially displaced distance and is provided with a low friction member such as ball 38 urged into engagement with the surface of the cam plate to follow the cam plate as the shaft is rotated. In this embodiment, the follower is fixedly mounted on a radially extending plate 40 coupled to shaft 12 by a collar 42 and set screw 44.

In order to ensure that the follower is urged into engagement with the cam plate, there is provided in this embodiment a second cam plate 46 pivotally mounted on pivot pin 48. The follower traverses the second cam plate via the ball roller 47. The parallelism is ensured by a strap 50 pivotally coupled to cam plates 16 and 46 by pins 52 and 54 respectively.

To balance the follower and to reduce system vibration, a stub shaft 56 is slidably mounted in plate 40 at a position 180° from the fixedly mounted shaft 36. A stub shaft provided with rollers 58 and 60 at the ends thereof.

Thus, in operation, when the cams are positioned to be radially extending, the shaft 12 rotates without axial displacement. However, when it is desired to provide for axial displacement of the shaft, the cam plates are tilted by moving push rod 22. The cam follower 36 is, thus, displaced from its central position as it follows the surface of cam plates 16 and 46, as indicated by the dotted outlines. As the follower traverses the cam, shaft 12 is then subjected to simultaneous axial displacement as well as rotation. As can be noted, the amplitude of axial displacement can be varied continuously during the operating cycle. In many applications, the hydraulic ram 30 can be actuated cyclically, thereby providing not only continuous control over oscillatory amplitude, but to vary the maximum amplitude in cyclic manner throughout the operation of the mechanism.

In some applications, a simpler structure may be employed when the load factors and the desired precision of movement is not as demanding and in such applications, the embodiment shown in FIG. 2 may advantageously be employed.

In FIG. 2, there is shown a rotating shaft 62. To provide for oscillation of the plate, there is provided a cam plate 64 having an aperture 66 therein through which shaft 62 passes. The cam plate 64 is hingedly mounted by hinge 68. A push rod 70 is provided to adjust the inclination of the plate about the hinge position. A cam follower 72 is mounted for rotation with said shaft at a position radially displaced therefrom. The follower 72 is provided with a roller 74 for low frictional engagement with the cam plate surface. As shown, the follower is mounted at the end of the radially extending arm 76 secured to a shaft 62. The follower is urged against the cam plate surface by the action of spring 78, one end of which is fixed to frame member 80 and the other end bears against the shaft through the thrust bearing 82 having a free rotating thrust plate 84 and a backing plate 86 secured to shaft 62.

The embodiment shown in FIG. 2 is far simpler in structure than that shown in FIG. 1. However, it must be noted that in the embodiment of FIG. 2, the midpoint of the stroke changes as the amplitude of the stroke changes due to the hinging of the cam plate at one end thereof. When it is desired to provide a stationary mid stroke position, the pivot point of the cam plate must be coincident with the axis of the shaft 62, as in the embodiment shown in FIG. 1.

When using the cam apparatus shown in both FIGS. 1 and 2, it is often desirable to employ the cam plate arrangement shown in FIG. 3.

The arrangement shown in FIG. 3 will be preferably employed in those applications where it is desired to maintain the frictional force on the follower as low as possible. In FIG. 3, there is shown a cam plate 88 having a thrust bearing consisting of a backing race 90, a rotatably mounted thrust plate 92 separated by ball bearings 94 or roller bearings, not illustrated. The assembly is maintained integral by a peripheral cup 96. The follower ball 98 is positioned to bear against the thrust bearing. By using the thrust bearing, if the follower ball jams or sticks for any reason, the thrust bearing will rotate thereby reducing torsional load upon the cam plate.

This invention may be variously modified and embodied within the scope of the subjoined claims.

What is claimed is:

1. A cam mechanism for imparting oscillatory motion of controllable stroke to a rotating shaft comprising a pair of parallel spaced-apart plates each having a central aperture with the rotating shaft extending through the apertures, the planes of the pair of plates being across the axis of the rotating shaft, said plates being pivotally mounted for inclining their planes with respect to the axis of the rotating shaft, means for maintaining the plates in parallel relation as they pivot, means for pivoting the pair of plates to selected positions of inclination relative to the axis of the rotating shaft, a cam follower plate mounted on the rotating shaft and extending generally radially therefrom between the pair of plates, a cam follower comprising a first follower shaft fixed on the cam follower plate and extending between the plates of said pair with its opposite ends engaging and riding on the respective inside surfaces of the pair of plates, thereby to vary the axial displacement of the rotating shaft as the inclination of the pair of plates is changed, and a second follower shaft, supported to be axially slidable through the cam follower plate at a point diametrically opposed from the first shaft, extending between the plates of said pair with its ends engaging and riding on the respective inside surfaces of the pair of plates.

2. The cam mechanism of claim 1 in which the means for pivoting the pair of plates comprises a push rod coupled to one of said plates and means for axially moving the push rod to selected positions.

References Cited

UNITED STATES PATENTS

| | | | |
|---|---|---|---|
| 1,416,731 | 5/1922 | Martin | 74—56 |
| 1,772,416 | 8/1930 | Craig | 74—56 |
| 2,328,542 | 9/1943 | Bates | 74—56 |

FOREIGN PATENTS

| | | |
|---|---|---|
| 499,264 | 6/1930 | Germany. |

FRED C. MATTERN, JR., *Primary Examiner.*

W. S. RATLIFF, *Assistant Examiner.*